United States Patent [19]

Nikelat

[11] 4,330,800
[45] May 18, 1982

[54] DATA DELETION DEVICE FOR MAGNETIC TAPES

[76] Inventor: Lothar Nikelat, Lannerstr. 26, D-4050 Monchen-Gladbach 4, Fed. Rep. of Germany

[21] Appl. No.: 168,203

[22] Filed: Jul. 10, 1980

Related U.S. Application Data

[63] Continuation-in-part of Ser. No. 18,714, Mar. 8, 1979, abandoned.

[30] Foreign Application Priority Data

Mar. 8, 1978 [DE] Fed. Rep. of Germany ....... 2809992

[51] Int. Cl.³ .......................... G11B 5/47; G11B 15/48
[52] U.S. Cl. ....................................... 360/66; 360/74.6
[58] Field of Search ....................... 360/66, 74.6, 72.1, 360/72.2, 72.3

[56] References Cited

U.S. PATENT DOCUMENTS

| | | | |
|---|---|---|---|
| 2,756,278 | 7/1956 | Goshwa | 360/66 |
| 2,826,642 | 3/1958 | Lyon et al. | 360/66 |
| 2,848,660 | 8/1958 | Boyers | 360/66 |

*Primary Examiner*—Vincent P. Canney
*Attorney, Agent, or Firm*—K. H. Boswell

[57] ABSTRACT

A data deletion device has a take-up reel and a supply reel each provided with a separate drive. The supply reel is for carrying tape to be cleared. A guiding device for the tape is provided, and a device for detecting a reflector marking is provided in the tape path between the supply reel and the take-up reel. The said latter device, upon detecting a reflector marking of the tape, sets a device by means of which the coil is energized at the earliest upon detection of the reflector marking, and a switching device is provided by means of which the coil is switched off at the earliest after one further revolution of the reel carrying the tape to be deleted.

10 Claims, 3 Drawing Figures

DATA DELETION DEVICE FOR MAGNETIC TAPES

CROSS REFERENCE TO RELATED APPLICATIONS

This application is a continuation-in-part of my application Ser. No. 18,714, entitled DATA DELETION DEVICE FOR MAGNETIC TAPES, filed Mar. 8, 1979 and now abandoned the entire disclosure of which is herein incorporated by reference.

BACKGROUND OF THE INVENTION

The invention relates to a data deletion device for magnetic tapes, in particular computer tapes.

Magnetic tapes, in particular computer tapes, usually comprise a so-called recognition code at their start which extends always over a known tape length.

Because of legal requirements or because of other demands, it is often necessary to delete the data on a magnetic tape in such a complete manner that no residual or partial information remains on the data carrier (tape) after deletion. On the other hand, however, it is frequently necessary or desirable that the said recognition code at the start of the tape remains undeleted.

Deletion devices are known in which the magnetic tape is rewound completely and is guided past a clearing head during rewinding. This method is very time-consuming and thus expensive. Furthermore, deletion devices are known in which relative movement occurs between a coil (choke) and a reel transversely to the plane of the reel. Admittedly these devices operate rapidly and reliably, but on the other hand, however, the entire information comprised on the tape, inclusive of the recognition code, is deleted.

SUMMARY OF THE INVENTION

The invention is based on the problem of how to provide a data deletion device for magnetic tapes, in particular computer tapes, which, on the one hand, can operate rapidly and reliably, and which, on the other hand, can leave undeleted the recognition code which is located at the start of the tape and whose start lies in the region of a reflector marking ('BOT').

According to the invention a data deletion device has a take-up reel provided with a separate drive, and the holder device for the supply reel containing the tape to be cleared comprises its own drive. A guiding device for the tape is provided, and a device for detecting a reflector marking (BOT) is provided in the tape path between the supply reel and the take-up reel. The said latter device, upon detecting a reflector marking of the tape, sets a device by means of which the coil is energized. The coil is energized at the earliest upon detection of the reflector marking (BOT), and a switching device is provided by means of which the coil is switched off at the earliest after one further revolution of the reel carrying the tape to be deleted.

DETAILED DESCRIPTION

Figure 1:
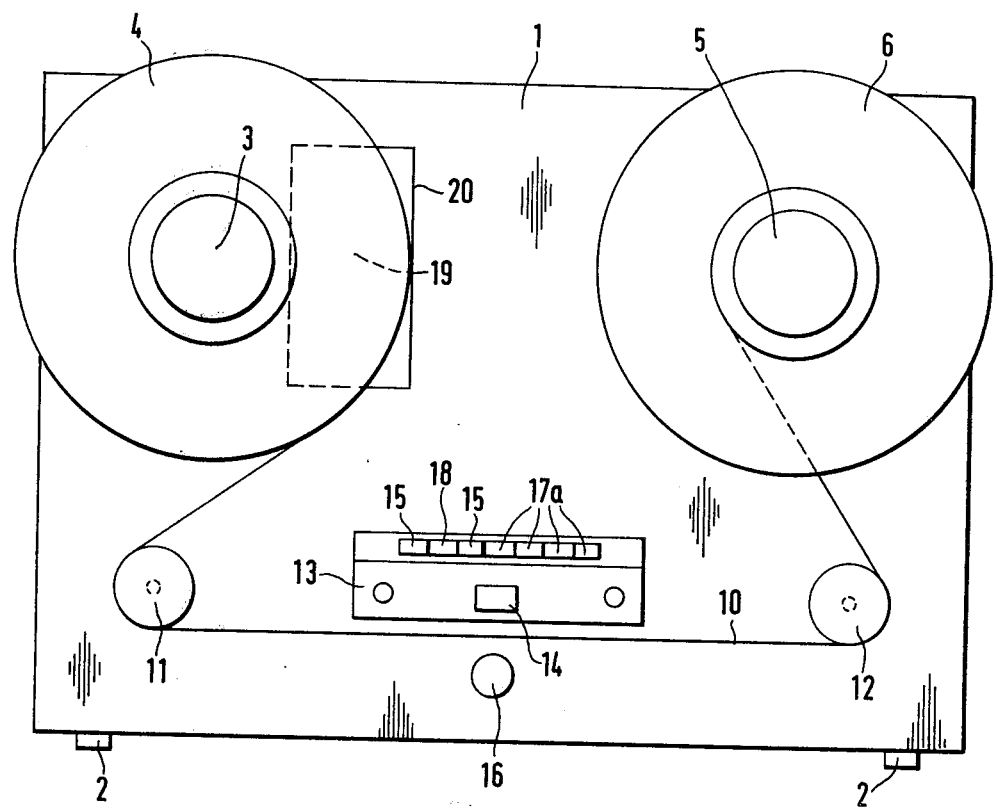
FIG. 1 is a diagrammatic frontal view of a constructional example of a data deletion device according to the invention.

The data deletion process may be effected in both traveling directions (forward travel or reverse travel) of the magnetic tape. A deletion process during forward travel is useful, for example, when a further process, for example, cleaning of the tape, is to be effected simultaneously. In this case the device according to the invention may be realized in a particular advantageous manner in that it is attached to one of the known cleaning devices for magnetic tapes. Such known devices comprise holder devices for the reel to be deleted and for an empty reel, each with its own drive, and guiding devices. Disposed in the tape path between the two reels are sapphire scrapers, and the tape to be cleaned is guided past them. It may be seen that such a magnetic tape cleaning device may be augmented by a data deletion device according to the present invention. Such a combined device may be designed to clean the magnetic tape without deletion of the data content, as well as to clean the magnetic tape with deletion of the data content and simultaneous protection of the recognition code. As a further alternative, data deletion without cleaning and with recognition code protection, and naturally also data deletion without cleaning and without recognition code protection is possible.

When the device is to be constructed simply as a data deletion device, the deletion process by the clearing effect of the coil arranged transverse to the plane of the reel preferably occurs during the reverse travel of the tape. It is provided that at the earliest the drives are switched to reverse travel after that period of time required by the reel with the tape to be deleted to make one revolution after detection of the reflector marking. Simultaneously the coil is then energized, so that the deletion process takes place. The electro-magnet is then switched off at the earliest upon renewed detection of the reflector marking.

The period of time after which the drives are switched to reverse travel corresponds preferably to three reel revolutions of the magnetic tape to be cleared. Admittedly, the data is basically deleted even after one revolution, but in order to be perfectly sure that no residual or partial information is still left on the data carrier, three tape revolutions are preferred. The switching-off of the coil effecting the deletion, at the earliest after renewed detection of the reflector marking, has the effect that a tape region remains undeleted. This undeleted tape region is located between the device for reflector recognition and the effective region of the electro-magnet, the so-called clearing field. This tape region contains the recognition code. The advantage of the two drives resides in that the winding process occurs with a tape traction compatible with the computer.

According to a further feature of the invention, it may be provided that the response point of the switching-off device is adjustable depending upon the desired length of the tape region not to be deleted. The adjustment may occur preferably in a stepless manner. Use may be made of this feature when the tape region containing the recognition code is shorter than the tape region remaining undeleted between the device for reflector marking recognition and the clearing field of the electro-magnet. The length of this tape region is known to the user. By adjusting the response point of the switching-off device, the de-energization of the electro-magnet can be delayed and thereby a shorter region of the magnetic tape remaining undeleted may be obtained. In order that deletion of magnetic tapes by unauthorized persons can be prevented, a further feature of the invention provides that the switching-on device of the data deletion device is lockable by means of a safety lock.

Referring to the figures, a casing 1 with support legs 2 has a holder device 3 for a supply reel 4 carrying magnetic tape to be deleted and furthermore a holder device 5 for an empty or take-up reel 6. The holder device 3 has a drive 7 constructed in the form of a motor. The holder device 5 for the empty reel 6 also has its own drive 9 constructed in the form of a motor. A guiding device for the magnetic tape 10 comprises guide rollers 11 and 12. A switching assembly 13 is disposed between the guide rollers 11 and 12 and includes a device 14 for detecting a reflector marking at the start of the tape (BOT). This device 14 comprises a lamp and a photo transistor which form a reflex light barrier. Also provided in the switching assembly are indicator lamps 15, for example for indicating the measuring voltage, the deletion process and the like, and furthermore actuator keys 17a as well as a switching-on device 18 which is lockable by means of a safety lock (not illustrated). On the side opposite (considered from the tape conveyance) the device 14, the casing 1 has attached thereto a photo transistor 16 by means of which it is possible to detect whether a tape is present or whether the tape is broken ("No-tape" detection).

Figure 2:
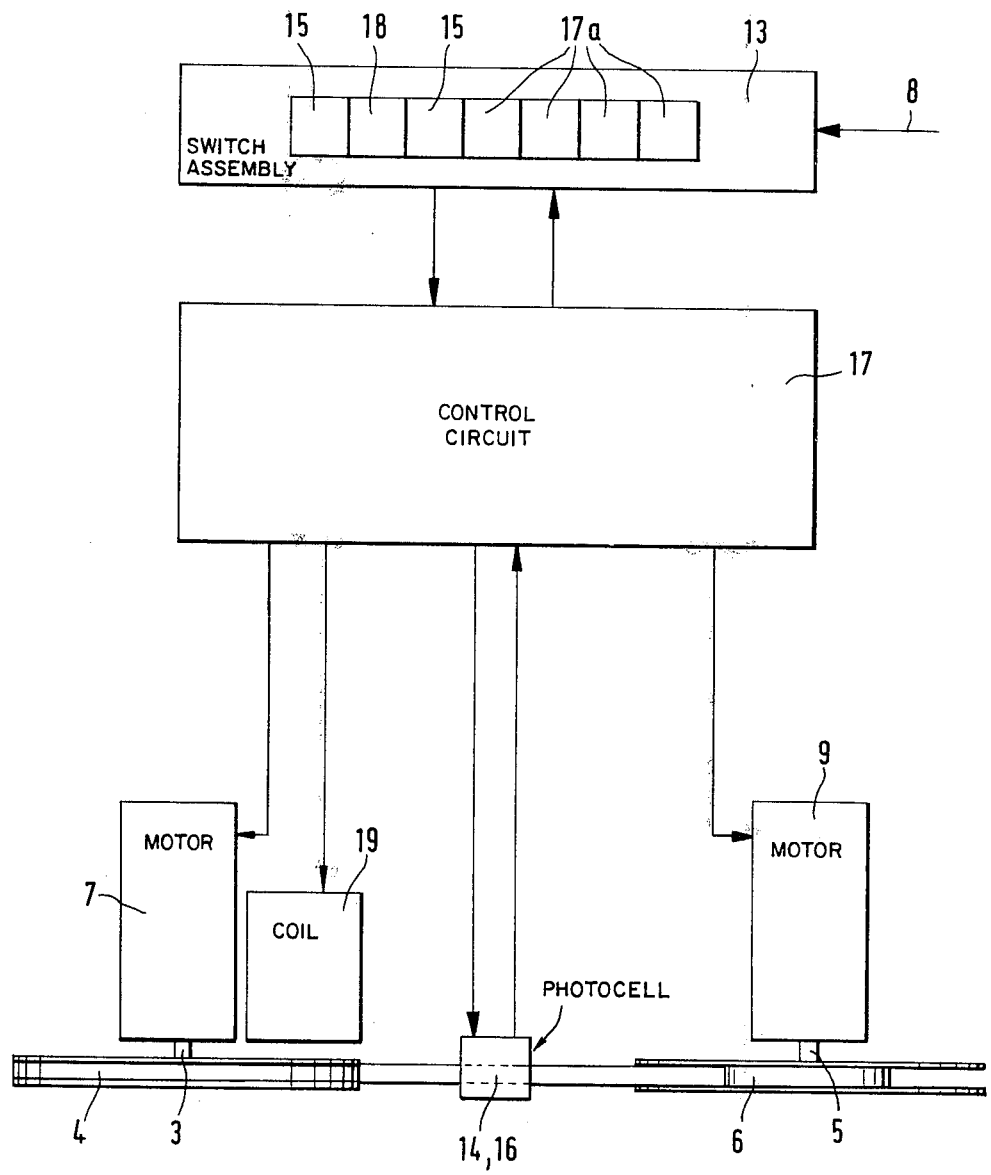
FIG. 2 is a block circuit diagram of the device according to FIG. 1, the position and association of some of the component parts being illustrated in accordance with a view from above.
Figure 3:
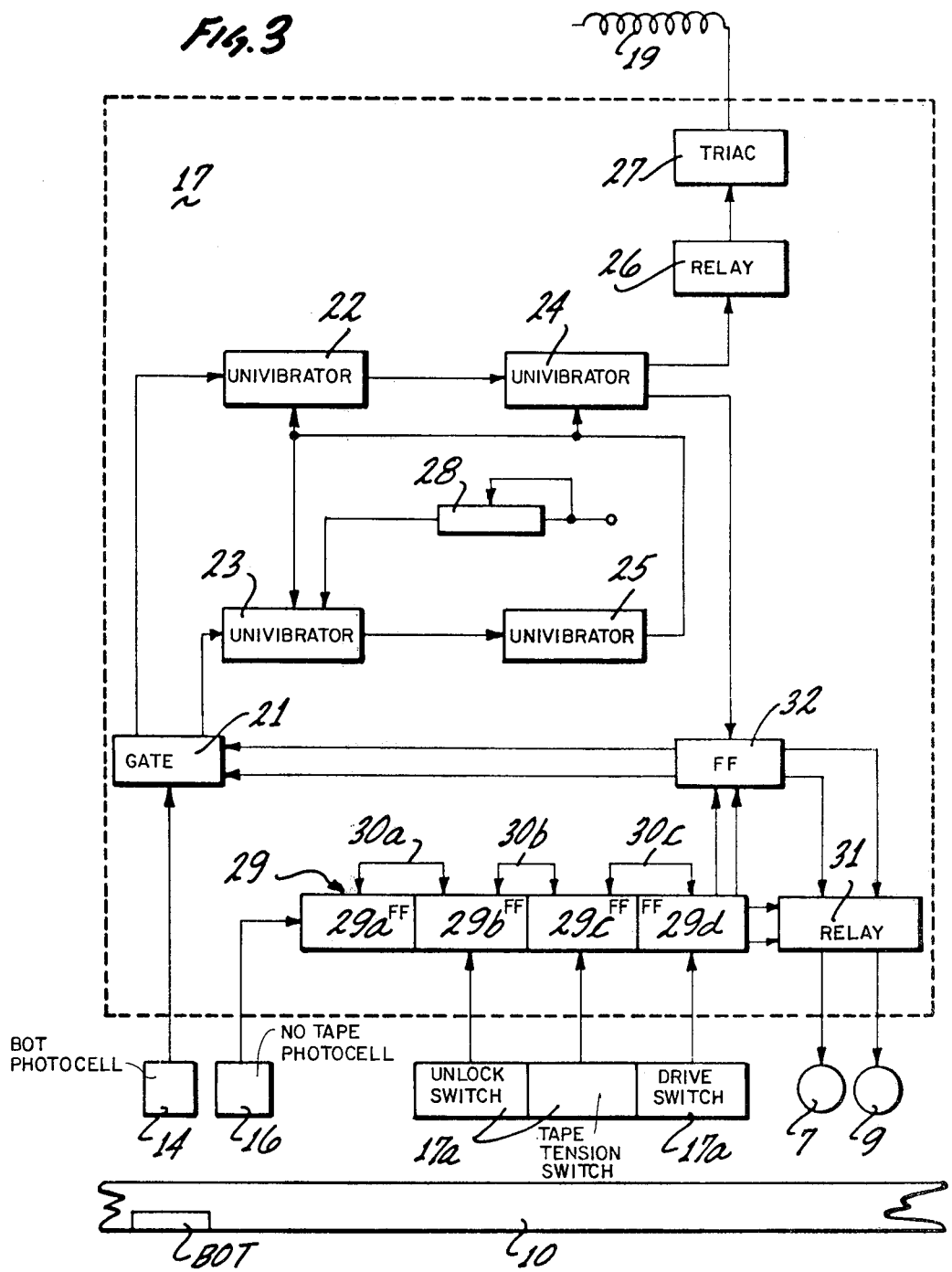
FIG. 3 is a schematic of the logic control circuit of the invention.

As may be seen in FIG. 2, the individual constructed elements are associated with each other by means of a logic control circuit shown in FIG. 3. This circuit comprises conventional electronic elements as are set forth hereinafter. The main connections of the data deletion device is affected at the switching assembly 13 in accordance with the arrow 8. A coil or electromagnet 19 constructed in the form of a choke is provided transverse to the plane of the reel 4 in the region of rotation of the tape which is wound on the reel 4 and which is to be cleared; in the energized state the coil 19 develops a clearing field 20 as seen in FIG. 1 having a magnetic field of strength of a magnitude such that the data contained on a magnetic tape which is wound about reel 4 is deleted when reel 4 is moved past the stationary located coil 19.

A reel 4 containing a magnetic tape with data located thereon which is to be deleted is placed upon a holder 3 as is shown in FIG. 1, the start of the tape 10 is then guided around guide rollers 11 and 12 and is inserted into the empty reel 6 located on holding device 5 by appropriate activation of one of the activator keys 17a. The drive motors 7 and 9 are switched on to cause a few turns of the magnetic tape to be wound off of reel 4 and onto reel 6. During winding of the tape between the reels the motors 7 and 9 operate in such a manner that the winding process occurs with a tape tension compatible with that that the tape is exposed to when used with a computer. This is achieved by driving the particular motor 7 or 9 which is connected to the reel 4 or 6 on which tape is being removed from in a forward direction with a very small amount of power compared to its normal forward travel. This produces a breaking effect for reverse travel, thus giving the desired tape tension activation of the tape tensing operation is by way of another of the activator keys 17a.

Within a tape region of a defined length, the magnetic tape 10 contains certain statements which in many cases it is desirable not to delete. The start of this recognition code is in the region wherein the reflective marking (BOT) is attached to the magnetic tape 10. The reflective marking is positioned on the side of the tape remote from the device 14. Upon detection of the reflective marking by the device 14 a switching signal is produced. In response to the switching signal a timing device in the logic control circuit 17 is set. As a predetermined period of time expires the reel 4 makes several revolutions. Then coil 19 is energized simultaneous with the reversal of the direction of travel of the motor drives 7 and 9. As result of this the several revolutions of tape which has been taken up on reel 6 are now unwound again off of reel 6 and wound onto reel 4. During the winding onto reel 4 the coil 19 is energized and the clearing field 20 deletes all data from the portions of the tape 10 which wound on reel 4 including that immediately being taken up from reel 6. When the reflective marking unwinds from reel 6 and again passes the detecting device 14 the coil 19 is shut off, but the winding of the tape from reel 6 to reel 4 continues until the entire amount of the tape 10 has been rewound onto reel 4.

The logic control circuit 17 is constructed as per FIG. 3. In response to the reflective marking, the device 14 feeds an input signal to the gate 21. Depending on the state of gate 21 the output of the gate 21 goes to either univibrator 22 or 23, however, only to one of them at a time and never to both simultaneously. Univibrator 22 feeds its output to univibrator 24 which in turn feeds output to reed relay 26. Reed relay 26 controls triac 27 and triac 27 controls the erase coil 19. Univibrator 23 feeds its output to univibrator 25. Univibrator 23 acts as a time stage during such times as it is activated and is adjustable for variable times by means of the potentiometer 28. When the time period set within the univibrator 23 expires it feeds an output to univibrator 25. The output of univibrator 25 is sent to univibrators 22, 23 and 24 to reset them.

The output of univibrator 24 is also fed to flip flop 32. The flip flop 32 controls the state of gate 21 and in addition is coupled to relay 31 which connects to drive motors 7 and 9 and controls the same.

The activator keys 17a and the photo transistor device 16 are electrically connected to the control unit 29. The unit 29, an integrated circuit such as an SAS 580 produced by Siemens Ag, contains a series of flip flops designated 29a, 29b, 29c and 29d which are electrically interconnected by couplings 30a, 30b and 30c. In response to input from the activator keys 17a and the photo transistor 16 the unit 29 is capable of generating, at any one time, one of several outputs or switching states. These include unlocking of the drive motors 7 and 9, production of the tape tension by the drive motors 7 and 9, the switching on of the drive motors 7 and 9 to start the tape running forward from reel 4 to reel 6 and the switching off of the device including the erase action by the photo transistor device 16 should a "No-tape" detection condition occur resulting from either breakage of the tape or complete rewinding of the tape back onto reel 4. In response to the activator keys 17a or the photo transistor device 16 the output of unit 29 is fed to the relay circuit 31 to control the drive motors 7 and 9 during tape loading, tape tensing and to start forward running of the tape from reel 4 to reel 6 and to the flip flop 32 for resetting the state of the gate 21 to the state wherein the first signal corresponding to the reflective marking or "BOT" is fed to the univibrator 22.

As was noted above, the photo transistor device 16 detects when a tape is present or when it is absent because of tearing or breaking. Additionally after the tape is completely rewound onto reel 4 from reel 6 the absence of the tape is likewise detected by the photo transistor device 16. This detection of absence of the tape switches off the device and the erasing action.

In practice the device is operated as follows. The tape to be deleted on reel 4 is located on device 3. The tape is then fed from reel 4 to reel 6 and the operation of the device is started by depressing the appropriate activator keys 17a to first unlock the motors 7 and 9, set the tension in the tape and then start the running of the motors to run tape from reel 4 to reel 6. As the tape is running from reel 4 to reel 6, when the reflective marking or BOT passes the photo transistor 14, a pulse is sent from the device 14 through gate 21 to univibrator 22. The reel 4 feeds tape to the reel 6 for the time period of the univibrator 22. When this time period expires the output pulse of univibrator 22 is sent to univibrator 24. Univibrator 24 is appropriately triggered turning on relay 26 and thus triac 27 to excite the erase coil 19 and at the same time a signal is sent to flip flop 32 which, through relay 31, stops the forward movement of the tape and reverses the drive motors 7 and 9 to rewind tape from reel 6 to reel 4. The pulse to flip flop 32 also switches the state of gate 21. During the rewinding of the tape back onto reel 4 the erase coil 19 is maintained in an energized state deleting the contents of that portion of the tape located on reel 4.

As the tape rewinds onto reel 4 from reel 6 the erase coil 19 being in an energized state erases the tape on reel 4. When the reflective marking or BOT now passes the photo transistor 14 going from reel 6 to reel 4 a signal is once again fed to gate 21. The gate 21, however, has been reset as noted above and this time the signal is sent to univibrator 23. The tape is wound onto reel 4 for the period of time set into univibrator 23 by the potentiometer 28. When this time period expires univibrator 23 transmits a pulse to univibrator 25. This triggers univibrator 25 producing a short output pulse that resets univibrator 24 ultimately switching off erase coil 19. The erase coil is now deenergized and the portion of the tape containing the data to be maintained is wound onto reel 4 and when the end of the tape is reached its absence is detected by photo transistor 16 and the device is switched off.

The output pulses of univibrator 25 also resets univibrators 22 and 23. In principle it would only be necessary for univibrator 25 to reset univibrator 24, however, univibrators 22 and 23 are also reset by univibrator 25 for safety sake since there may be random time set in them. Instead of the above discussed time stage constituting the univibrators 22, 23 and 24 and potentiometer 28, an electronic counter could be utilized to perform the same process.

The data on the magnetic tape has thus been deleted with the exception of the data located on the tape region between the reflective marking and the end of the tape which was not passed through the clearing field 20 upon rewinding the tape onto reel 4. The dimension of the tape region which is not erased may be selected without difficulty such that the recognition code which is not to be deleted will be contained within this region of the tape. If the length of the tape harboring the recognition code is shorter than the length of the tape defined by the reflector marking the switching off of the coil 19 can be appropriately delayed after passage of the reflective marking by the device 14. The response period where the switching off of the coil 19 occurs may be appropriately adjusted, preferably in a stepless manner, depending upon the desired length of tape region not to be cleared.

The data deletion device of the invention as described above permits unwanted data contained on magnetic tapes to be deleted rapidly without concurrently deleting data contained in a recognition code located at the start of the tape.

I claim:

1. A data deletion device for magnetic tapes, in particular computer tapes, and wherein said magnetic tape includes a reflector marking located on said tape, said device comprising a supply reel and a take-up reel each provided with a separate drive, data deletion means comprising a coil disposed adjacent to and transversely to the plane of said supply reel, a guiding device for guiding tape along a tape path from said supply reel to said take-up reel, a reflector marking recognizing device for recognizing said reflector marking on said tape, said reflector marking recognizing device being provided in the tape path and said reflector marking recognizing device generating a switching signal in response to detection of said reflector marking on said tape to set a device by means of which said coil is energized, said coil thus being energized no earlier than upon detection of said reflector marking, and said data deletion device having a switching device by means of which the coil is switched off no earlier than after one further revolution of said supply reel containing said tape to be deleted, said one further revolution being further to the energizing of said coil.

2. The data deletion device of claim 1 wherein:
said device for energizing said coil is constructed in the form of a variable timer.

3. The data deletion device of claim 1 wherein:
said device for energizing said coil is arranged to energize said coil during winding of the tape on to the take-up reel, said winding continuing for at least one revolution of the supply reel with the tape to be deleted.

4. The data deletion device of claim 3, and further comprising:
a cleaning device through which the tape passes during said winding of the tape on to the take-up reel.

5. The data deletion device of claim 1 wherein:
said device for energizing said coil is arranged to energize said coil during winding-back of the tape from the tape-up reel to the supply reel, said coil being energized not before a revolution of the supply reel following the detection of the reflector marking, said switching device being arranged to switch off said coil not before renewed detection of the reflector marking.

6. The data deletion device of claim 5 further comprising:
a delay device for effecting delay in the switch-off of the coil in order that the length of undeleted tape may be adjusted.

7. The data deletion device of claim 5 wherein:
the response point of said switching-off device is adjustable depending upon the desired length of tape region to be cleared.

8. The data deletion device of claim 7 wherein:

said response point of the switching-off device is adjustable in a stepless manner.

9. The data deletion device of claim 7 further comprising:
a switching-on device which is lockable by means of a safety lock.

10. A method for deleting data from a magnetic tape wherein said magnetic tape includes a reflector marking located on said tape in which tape is advanced from a supply reel to a take-up reel and then wound back after said reflector marking on the tape has been recognized, an erasing magnetic field being generated electrically and applied to the tape on the supply reel after the reflector marking has been recognized while the tape is advanced forward from said supply reel to said take-up reel or after the reflector marking has been recognized while the tape is winding back from said take-up reel to said supply reel, said erasing field not being applied to a starting length of the tape which is unwound from said supply reel before said erasing field is generated.

* * * * *